G. B. TIMBERLAKE.
SPRING WHEEL.
APPLICATION FILED AUG. 25, 191
1,349,019.
Patented Aug. 10, 1920.
2 SHEETS—SHEET 1.
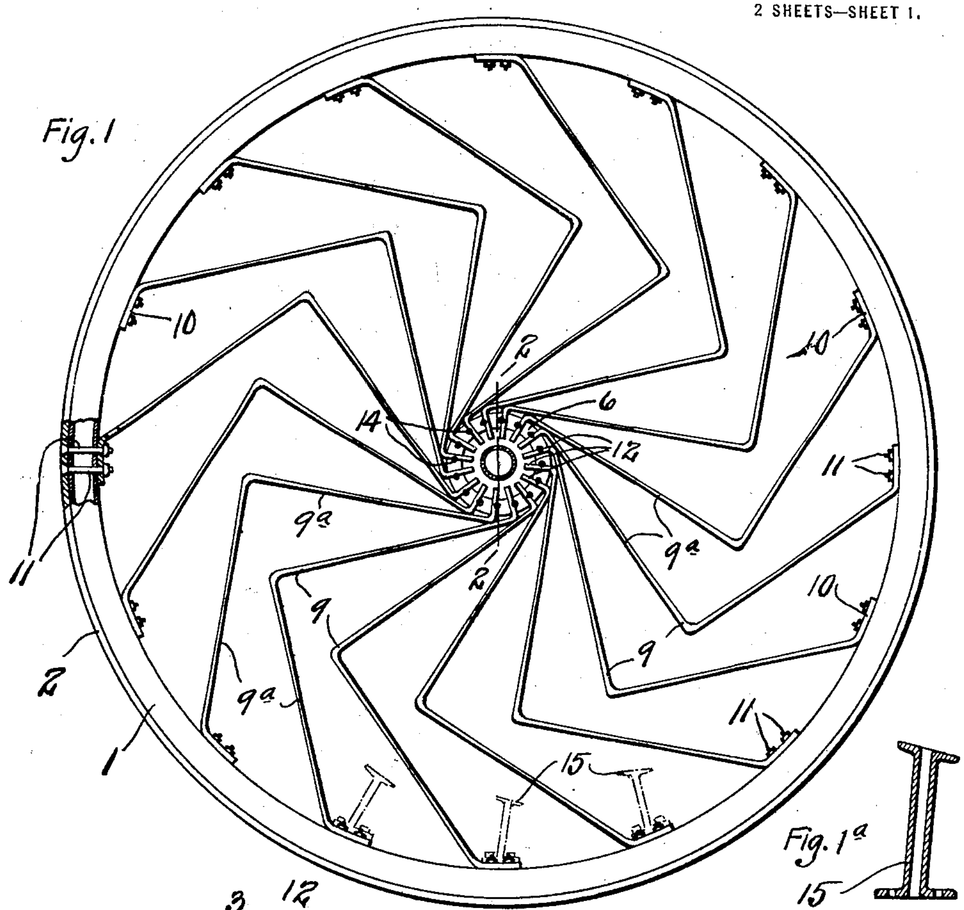
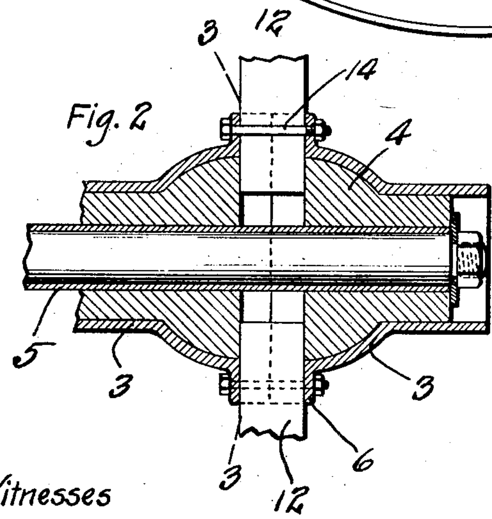
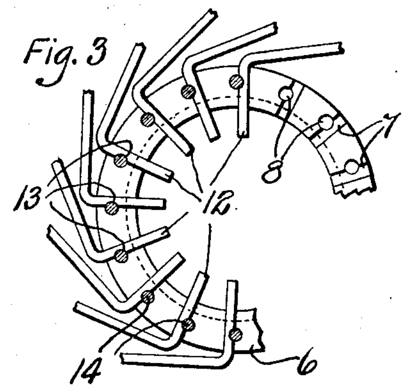
Witnesses
Wm. Janus
W. P. Smith
Inventor
George B. Timberlake
By F. W. Cornwall, Att'y.

G. B. TIMBERLAKE.
SPRING WHEEL.
APPLICATION FILED AUG. 25, 1917.
1,349,019.
Patented Aug. 10, 1920.
2 SHEETS—SHEET 2.
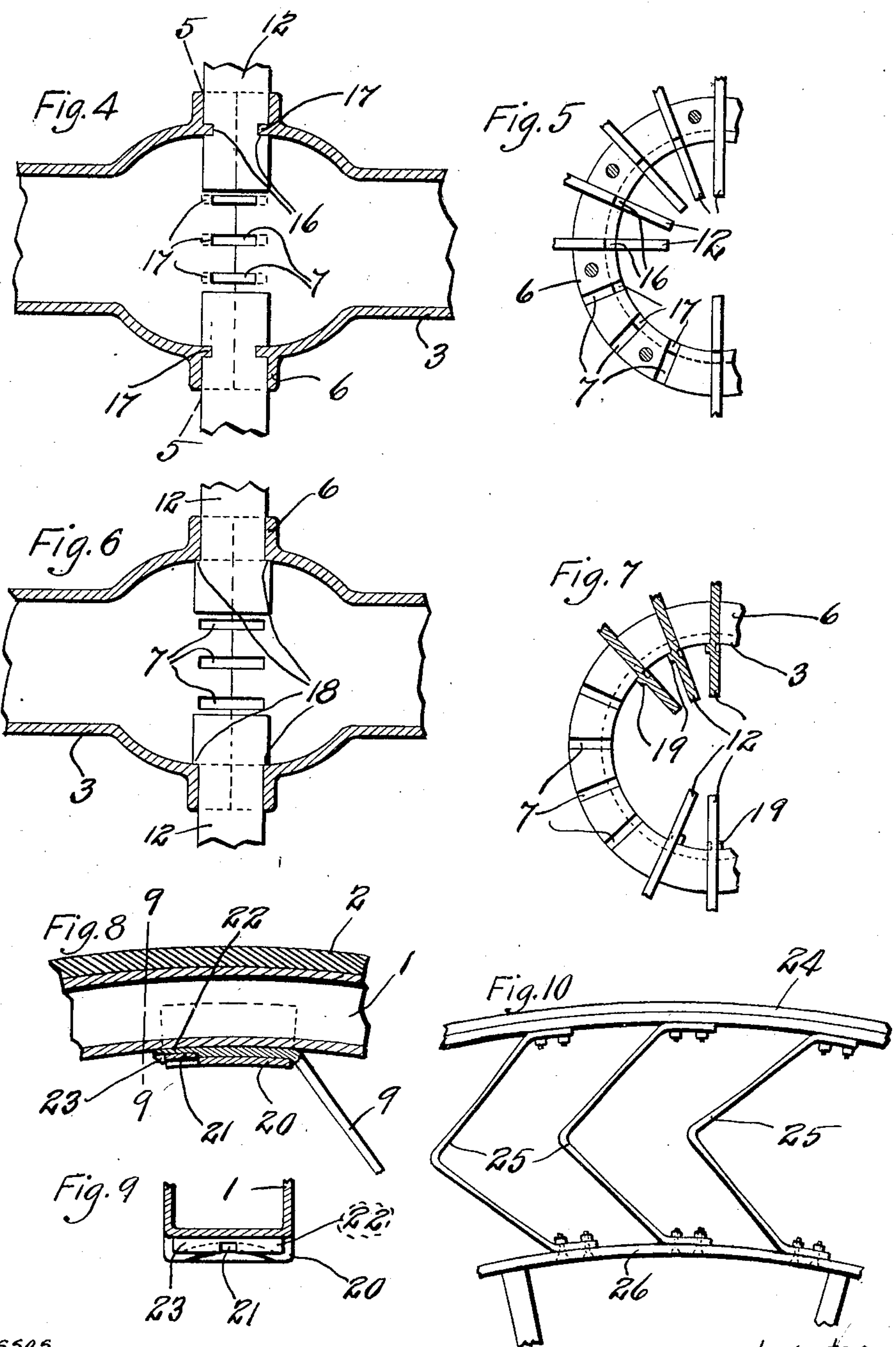
Witnesses
Wm. Janus
W. P. Smith
Inventor
George B. Timberlake
By [signature] Att'y.

UNITED STATES PATENT OFFICE.

GEORGE B. TIMBERLAKE, OF ST. LOUIS, MISSOURI.

SPRING-WHEEL.

1,349,019. Specification of Letters Patent. Patented Aug. 10, 1920.

Application filed August 25, 1917. Serial No. 188,201.

*To all whom it may concern:*

Be it known that I, GEORGE B. TIMBERLAKE, a citizen of the United States, residing at the city of St. Louis, State of Missouri, have invented a certain new and useful Improvement in Spring-Wheels, of which the following is a full, clear, and exact description, such as will enable others skilled in the art to which it appertains to make and use the same.

My invention relates to a vehicle wheel, and the principal object of my invention is to construct a comparatively simple, inexpensive wheel having a series of resilient spokes arranged between the rim and hub whereby the jar and vibration incident to the travel of the wheel upon a roadway will be almost entirely absorbed within the wheel instead of being transmitted to the vehicle and its load.

A further object of my invention is to construct an all-metal wheel and to utilize and arrange a series of spokes between the rim and hub, said spokes being so formed as to produce great resiliency, thereby providing a wheel which possesses all the desirable features of a pneumatic tire type of wheel without the expense and many disadvantages incident to the use of pneumatic tires.

A further object of my invention is to provide a wheel with resilient spokes so formed and arranged as to overcome all tendency of the rim portion of the wheel to move laterally with respect to the hub while the wheel is in operation, and particularly while the vehicle is making a turn in either direction.

A further object of my invention is to produce a wheel which, in addition to its resiliency, possesses great strength and durability, and which wheel can be cheaply manufactured and kept in repair with comparatively little expense.

With the above and other objects in view, my invention consists in certain novel features of construction and arrangement of parts hereinafter more fully described, and illustrated in the accompanying drawings, in which:

Figure 1 is a side elevational view of a spring wheel of my improved construction, a part of the hub being removed and a part of the rim being in section for the purpose of more clearly illustrating the construction of the wheel.

Fig. 1[a] is a detail sectional view of a buffer block or shock absorber which is adapted for use on the rim of my improved wheel.

Fig. 2 is an enlarged sectional view taken approximately on the line 2—2 of Fig. 1.

Fig. 3 is a sectional view taken approximately on the line 3—3 of Fig. 2.

Fig. 4 is a sectional view through the hub of a wheel of my improved construction and showing a modified arrangement for attaching the spokes to the hub.

Fig. 5 is a detail section taken approximately on the line 5—5 of Fig. 4.

Fig. 6 is a section of the hub and showing a further modified arrangement of attaching the spokes to said hub.

Fig. 7 is a detail section showing a further modified arrangement of attaching the inner ends of the spokes to the hub.

Fig. 8 is a sectional view of a portion of the rim of the wheel and showing a modified arrangement of attaching the outer ends of the spokes to the rim.

Fig. 9 is a cross section taken approximately on the line 9—9 of Fig. 8.

Fig. 10 is a detail elevational view of a portion of the rim of a wheel, the same being constructed in accordance with my invention.

Referring by numerals to the accompanying drawings, 1 designates the rim of the wheel which is preferably in the form of a tube and to which is applied an ordinary metal tire 2. It will be understood that the rim can be of any desired cross sectional shape, and if desired, a cushion or composition tire can be applied to said rim. The hub of my improved wheel comprises a pair of mating tubular members or shells 3 which inclose blocks 4 of wood or composition, and seated in said blocks is a metal sleeve 5 which serves as a bearing for the spindle of the axle.

Formed on or fixed to the meeting edges of the shells 3 are outwardly projecting flanges 6, and formed in the inner faces of said flanges are radially disposed slots 7. Formed through the flanges 6 at the sides of the slots 7 are apertures 8 which are adapted to receive bolts or like fastening devices by means of which the inner ends of the spokes are attached to the hub. The spokes 9 of my improved wheel are preferably constructed of flat sections of resilient metal, such as steel, and each spoke is bent near its center to form a pair of legs $9^a$, the same being arranged substantially at right angles to each other. These legs are formed so that their central portions are comparatively thin, and from said central portions, said legs gradually increase in thickness toward their ends. Thus each spoke is composed of a pair of legs each having a centrally disposed thin portion which will yield more readily than the end portions of the legs or those portions which are fixed to the hub and rim and the portions adjacent the bent center of each spoke. By such construction the spokes have greater resiliency than where the spokes are of equal thickness throughout their length, and at the same time said spokes have sufficient transverse rigidity to withstand any tendency of the rim portion of the wheel to move laterally relative to the hub. The outer ends of the outer legs of the spokes are bent slightly, as designated by 10, and said bent ends bear directly against and are fixed to the rim 1 in any suitable manner, preferably by means of bolts or rivets 11, which pass through said bent ends and are seated in the rim and tire. The inner ends of the inner legs of the spokes are bent substantially at right angles to said inner legs, as designated by 12, and these bent inner ends occupy the coinciding slots 7 formed in the flanges 6. Formed in one of the side faces of each inwardly bent end 12 is a notch 13, which, when said inner end is properly seated in the hub, coincides with the corresponding aperture 8. Bolts 14 or like fastening devices are inserted through the apertures 8 and notches 13, thereby firmly securing the inner ends of the spokes to the hub. In case one of the resilient spokes becomes broken or unfit for service, it can be readily detached and a new spoke inserted.

In order to support the resilient spokes against excessive yielding movement toward the rim of the wheel, I provide short tubular members 15 which act as shock absorbers or buffers, and these can be attached in any suitable manner to the inside of the rim at the outer end of each spoke, as shown by dotted lines in Fig. 1.

In Figs. 4 and 5, I have shown a modified arrangement of fastening the inner ends of the spokes, and where such construction is carried out the side edges of the inner ends of the spokes are notched, as designated by 16, and these notches receive corresponding lugs 17 which project inwardly from the flanges 6.

In the modified construction illustrated in Fig. 6, the inner ends of the spokes are wider than the body portion, thereby providing shoulders 18 which, when the spokes are assembled on the hub, engage directly against the inner faces of the tubular members or shells 3.

In the modified construction illustrated in Fig. 7, the inner ends of the spokes are punched so as to produce shoulders 19, which, when the hub and spokes are assembled, bear directly against the inner faces of the shells 3.

The modified arrangement of fastening the outer ends of the spokes to the rim illustrated in Figs. 8 and 9, comprises a loop 20 which is fixed to the inside of the rim, and one end of said loop is transversely slotted and then bent inward to form a resilient retaining rib or keeper 21. The bent outer end of the spoke is provided at its outer end with a narrow tongue 22 which is adapted to slip beneath the keeper 21, and formed on the outer end of said tongue is a lug 23 having a beveled outer end which is forced beneath the keeper 21 when the rim and spokes are assembled.

In the modified construction illustrated in Fig. 10, a combined rim and tire 24 is fixed to the outer ends of a series of comparatively short spokes 25, the same being substantially like the spokes 9, and the inner ends of these spokes 25 are fixed in any suitable manner to a ring 26 which is rigidly fixed to the wheel hub. This arrangement provides for the application of my invention to the rim portion only of a wheel.

By bending each spoke to form two legs which are arranged at substantially right angles to each other, and by varying the thickness of the legs and making the same thinnest at their central portions, I am able to produce a wheel having great resiliency combined with strength and durability, and the rim portion of which wheel is effectively held against lateral movement with respect to the hub. Any movement of the rim portion of the wheel with respect to the hub throws all of the spokes into action, and thus practically all jar and vibration which would otherwise be transmitted to the load during the passage of the wheel over rough or uneven ground, is eliminated.

When spokes of my improved construction are combined with the hub and rim, the inner legs of the spokes are substantially tangent to the hub, and the outer legs are substantially tangent to the rim.

It will be readily understood that minor changes in the size, form and construction of the various parts of my improved spring wheel may be made and substituted for those herein shown and described, without departing from the spirit of my invention, the scope of which is set forth in the appended claims.

I claim:

1. In a vehicle wheel, the combination with a hub and rim, of a spoke formed of a single piece of metal bent to form a pair of legs arranged substantially at right angles to each other and each of which legs varies in thickness throughout its length with the thinnest portion at the center of the leg.

2. In a vehicle wheel, the combination with a hub and rim, of a spoke formed of a single piece of metal bent to form a pair of legs arranged substantially at right angles to each other, said legs tapering in thickness from the center toward each end.

In testimony whereof I hereunto affix my signature in the presence of two witnesses this 15th day of August, 1917.

GEORGE B. TIMBERLAKE.

Witnesses:

M. P. SMITH,

LAURA MEYER.